(12) United States Patent
Yagi (10) Patent No.: US 8,568,273 B2
(45) Date of Patent: Oct. 29, 2013

(54) HYDRAULIC CONTROL DEVICE

(75) Inventor: Noriyuki Yagi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 35 days.

(21) Appl. No.: 13/390,451

(22) PCT Filed: May 27, 2010

(86) PCT No.: PCT/JP2010/058996
§ 371 (c)(1),
(2), (4) Date: Feb. 14, 2012

(87) PCT Pub. No.: WO2011/021421
PCT Pub. Date: Feb. 24, 2011

(65) Prior Publication Data
US 2012/0138415 A1    Jun. 7, 2012

(30) Foreign Application Priority Data
Aug. 21, 2009  (JP) ................................. 2009-192206

(51) Int. Cl.
*F16H 61/26*  (2006.01)
(52) U.S. Cl.
USPC .......................................................... 477/127
(58) Field of Classification Search
USPC ................................................. 477/127–164
See application file for complete search history.

(56) References Cited

U.S. PATENT DOCUMENTS

| | | | |
|---|---|---|---|
| 5,119,698 A * | 6/1992 | Sugaya et al. ................... | 477/39 |
| 5,605,516 A | 2/1997 | Tsukamoto et al. | |
| 6,019,700 A * | 2/2000 | Imai et al. ....................... | 477/45 |
| 6,155,949 A | 12/2000 | Long et al. | |

FOREIGN PATENT DOCUMENTS

| | | |
|---|---|---|
| JP | 08-159262 A | 6/1996 |
| JP | 11-182658 A | 7/1999 |
| JP | 2001-027313 A | 1/2001 |
| JP | 2003-254420 A | 9/2003 |
| JP | 2005-090665 A | 4/2005 |
| JP | 2006-037984 A | 2/2006 |
| JP | 2009-168117 A | 7/2009 |

OTHER PUBLICATIONS

International Search Report of PCT/JP2010/058996, mailing date Aug. 17, 2010.
Office Action dated Aug. 27, 2013, issued in corresponding Japanese Application No. 2011-527601.

* cited by examiner

*Primary Examiner* — Tisha Lewis
(74) *Attorney, Agent, or Firm* — Westerman, Hattori, Daniels & Adrian, LLP (57) ABSTRACT

A hydraulic control device is provided with a linear solenoid valve, a shift valve, and a controller. The linear solenoid valve has a gain switching chamber which produces a biasing force in a direction to close the linear solenoid valve to switch the gain characteristic of the linear solenoid valve when oil pressure is supplied to the gain switching chamber. The shift valve is configured to be switchable between a supply state in which the output oil pressure from the linear solenoid valve is supplied to the gain switching chamber and a blocked state in which the supply of the output oil pressure is blocked. The controller brings the shift valve into the supply state when a necessary oil pressure of an engagement element is high and into the blocked state when the necessary oil pressure of the engagement element is low.

5 Claims, 8 Drawing Sheets

HYDRAULIC CONTROL DEVICE

BACKGROUND OF THE INVENTION

1. Field of the Invention

The present invention relates to a hydraulic control device for an automatic transmission.

2. Related Background Art

Hitherto, there has been known a hydraulic control device for an automatic transmission provided with a regulator valve which is configured to regulate a line pressure to be supplied freely to an engagement element and a linear solenoid valve which is configured to regulate a line pressure for adjusting an opening degree of the regulator valve and supply it to one end of the regulator valve (for example, refer to Japanese Patent Laid-open No. 2005-90665). Moreover, there has been known as well a device which is configured to supply an output oil pressure from the linear solenoid valve directly to the engagement element.

In the conventional hydraulic control device, in coping with plural oil pressures, the maximum output oil pressure from the linear solenoid valve is preliminarily set at the highest necessary oil pressure. When engaging the engagement element at a low necessary oil pressure, a driving electric current is controlled so as to give an appropriate output oil pressure. However, since the control range of electric current for regulating the necessary oil pressure to a low pressure is narrow, there arises a problem that the controllability of the output oil pressure for engaging the engagement element is not good.

SUMMARY OF THE INVENTION

The present invention has been accomplished in view of the aforementioned problems, and it is therefore an object of the present invention to provide a hydraulic control device for an automatic transmission capable of improving the controllability.

[1] The hydraulic control device for the automatic transmission of the present invention comprises: a linear solenoid valve configured to regulate a line pressure and supply it to an engagement element; a shift valve configured to be supplied with an output oil pressure from the linear solenoid valve; and a controller configured to control the linear solenoid valve and the shift valve; wherein the linear solenoid valve is provided with a gain switching chamber which generates a biasing force in a direction to close the linear solenoid valve to switch the gain characteristic of the linear solenoid valve when supplied with an oil pressure, the shift valve is configured to be freely switched between a supply state in which the output oil pressure from the linear solenoid valve is supplied to the gain switching chamber of the linear solenoid valve and a blocked state in which the supply of the output oil pressure is blocked, and the controller is configured to bring the shift valve into the blocked state when a necessary pressure of the engagement element is high and into the supply state when the necessary oil pressure of the engagement element is low.

According to the present invention, it is possible to switch the gain characteristic (current-oil pressure characteristic) of the linear solenoid valve according to the levels of the necessary oil pressures of the engagement element. Thus, even though the necessary oil pressure of the engagement element is low, it is possible to switch to the gain characteristic having a small increasing rate of the output oil pressure with respect to a driving current; thereby, it is possible to control the driving current in a wider range than the conventional arts, and consequently to improve the controllability of the output oil pressure.

[2] As a first aspect of the present invention, the engagement element is a wet multi-plate clutch capable of being engaged at a plurality of gear speeds of the automatic transmission, and a first necessary oil pressure is required to engage the wet multi-plate clutch at a first gear speed in the plurality of gear speeds and a second necessary oil pressure lower than the first necessary oil pressure is required to engage the wet multi-plate clutch at a second gear speed in the plurality of gear speeds; and the controller is configured to switch the shift valve to the blocked state at the first gear speed and switch the shift valve to the supply state at the second gear speed.

According to the first aspect of the present invention, in the wet multi-plate clutch where the necessary oil pressure is switched between the first gear speed (for example, a reverse gear speed) and the second gear speed (for example, a forward gear speed), by switching to a smaller gain characteristic at the second gear speed than at the first gear speed, it is possible to ensure a current control range wider than the conventional arts, and consequently to improve the controllability of the wet multi-plate clutch at a forward gear speed.

[3] As a second aspect of the present invention, the necessary oil pressure of the engagement element is configured to be switched between a plurality of levels and switched to a high pressure in accordance with an increment on an opening degree of an accelerator pedal; the controller is configured to switch the line pressure, which is regulated by a regulator valve, between a plurality of levels by controlling the output oil pressure from the linear solenoid valve for the regulator valve, and switch the line pressure to a high pressure in accordance with an increment on the opening degree of the accelerator pedal; and the shift valve is configured to be switched between the supply state and the blocked state according to the supply of the output oil pressure or the line pressure from the linear solenoid valve for the regulator valve in such a way that the shift valve is switched to the blocked state when the line pressure is high and to the supply state when the line pressure is low.

According to the second aspect of the present invention, since the linear solenoid valve for the engagement element can be switched to an appropriate gain characteristic in accordance with the necessary oil pressure of the engagement element which varies according to the opening degree of the accelerator pedal, it is possible to improve the controllability.

In the second aspect of the present invention, the shift valve is controlled by the controller via the output oil pressure or the line pressure from the linear solenoid valve for the regulator valve which supplies the output oil pressure to the regulator valve regulating the line pressure.

[4] In the second aspect of the present invention, if the line pressure and the necessary oil pressure of the engagement element is configured to be switchable among 3 levels or more in accordance with the opening degree of the accelerator pedal, by disposing a plurality of the gain switching chambers in the linear solenoid valve, it is possible to switch the gain characteristic finely.

Specifically, it is acceptable that the shift valve is configured to be switched to the blocked state when the line pressure is the maximum, and switched to the supply state at a plurality of levels so as to increase the numbers of the gain switching chambers supplied with the output oil pressure from the linear solenoid valve as the line pressure decreases sequentially.

[5] As a third aspect of the present invention, the shift valve is connected to two engagement elements, having different necessary oil pressures, and the shift valve is configured to be switched to the blocked state if the output oil pressure from the linear solenoid valve is supplied to one engagement element having a higher necessary oil pressure and to the supply state if the output oil pressure from the linear solenoid valve is supplied to the other engagement element having a lower necessary oil pressure.

According to the third aspect of the present invention, it is possible to switch the gain characteristic of the linear solenoid valve which supplies the output oil pressure selectively to the two engagement elements having different necessary oil pressures according to the levels of the necessary oil pressures. Therefore, compared with the case where only one gain characteristic is used to cope with such situation, it is possible to ensure the current control range when engaging the engagement element of a lower pressure, and consequently to improve the controllability.

In addition, it is possible to provide the shift valve which switches the supply destination of the output oil pressure from the linear solenoid valve with such function as switching the gain characteristic. Therefore, it is possible to reduce the numbers of components so as to simply the structure thereof.

DETAILED DESCRIPTION OF THE PREFERRED EMBODIMENTS

First Embodiment

A first embodiment of the present invention will be described in detail with reference to FIG. 1 and FIG. 2. A hydraulic control device of the first embodiment is provided with a linear solenoid valve 1 configured to regulate a line pressure PL and supply it to a wet multi-plate clutch CL equivalent to an engagement element of an automatic transmission, a shift valve 2 supplied with an output oil pressure from the linear solenoid valve 1, and a transmission control unit TCU (not shown) equivalent to a controller configured to control the linear solenoid valve 1 and the shift valve 2.

Figure 1:
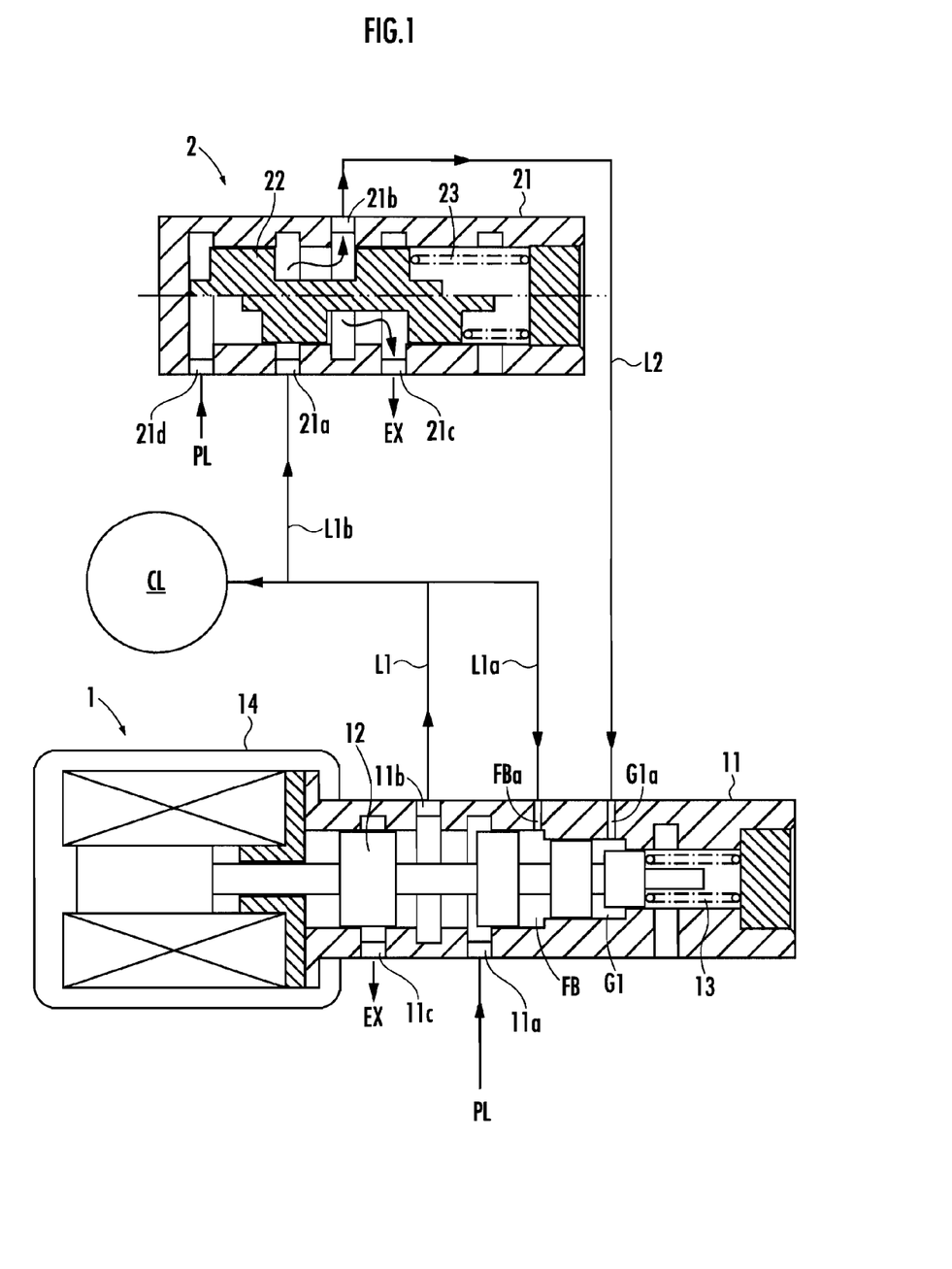
FIG. 1 is a diagram illustrating a hydraulic control device of a first embodiment of the present invention.

The linear solenoid valve 1 is a normally close typed valve which is closed in a state where no electric current is applied (non-conducting state), and is composed of a sleeve 11, a spool 12 slidably inserted in the sleeve 11, a spring 13 biasing the spool 12 toward the left side of FIG. 1, and a linear solenoid 14 capable of biasing the spool 12 toward the right side of FIG. 1 against a biasing force of the spring 13.

The sleeve 11 is drilled with an input port 11$a$, an output port 11$b$, and a drain port 11$c$. An oil pressure supplied from an oil pump (oil pressure supply source, not shown) is regulated by a regulator valve (not shown) into the line pressure PL and the line pressure PL is supplied into the input port 11$a$. The output port 11$b$ is connected to the multi-plate clutch CL via an oil passage L1.

A circular feedback chamber FB is defined in the linear solenoid valve 1 by the sleeve 11 and the spool 12 at a position right to the ports 11$a$ to 11$c$. The feedback chamber FB is configured in such a way that the surface area of the spool 12 constituting the end surface toward the linear solenoid 14 (left side) is greater than the surface area of the spool 12 constituting the end surface toward the spring 13 (right side).

The sleeve 11 is drilled with a feedback port FBa in communication with the feedback chamber FB. An output oil pressure from the linear solenoid valve 1 is supplied through an oil passage L1$a$ branched from the oil passage L1 to the feedback chamber FB via the feedback port FBa.

Under the control of the transmission control unit TCU (not shown), when the current-carrying capacity (driving current) to the linear solenoid 14 increases, the linear solenoid 14 biases the spool 12 rightward against the biasing force of the spring 13. Thereby, the input port 11$a$ is opened, and the oil pressure relative to an opening degree of the input port 11$a$ is output from the output port 11$b$ as the output oil pressure.

A part of the oil pressure output from the output port 11$b$ is supplied to the feedback chamber FB via the oil passage L1$a$ and the feedback port FBa. The feedback chamber FB is configured in such a way that the surface area of the spool 12 constituting the end surface toward the linear solenoid 14 (left side) is greater than the surface area of the spool 12 constituting the end surface toward the spring 13 (right side).

Thereby, a biasing force for biasing the spool 12 toward the linear solenoid 14 (left side) is generated according to the output oil pressure supplied from the linear solenoid valve 1 to the feedback chamber FB. According thereto, the spool 12 stops at a position where the biasing force from the linear solenoid 14 is balanced with the biasing force from the spring 13 and the biasing force from the oil pressure supplied to the feedback chamber FB.

By disposing the feedback chamber FB, the biasing force generated in the feedback chamber FB toward the left side varies in inverse proportion to the variation of the output oil pressure. Specifically, if the oil pressure supplied to the feedback chamber FB increases, the biasing force generated in the feedback chamber FB increases, which decreases the opening degree of the input port 11$a$, and consequently, the output oil pressure from the linear solenoid valve 1 is decreased.

On the other hand, if the oil pressure supplied to the feedback chamber FB decreases, the biasing force generated in the feedback chamber FB decreases, which increases the opening degree of the input port 11$a$, and consequently, the output oil pressure from the linear solenoid valve 1 is increased. Thereby, it is possible to improve the stability of the output oil pressure from the linear solenoid valve 1.

A circular first gain switching chamber G1 is defined in the linear solenoid valve 1 by the sleeve 11 and the spool 12 at a position right to the feedback chamber FB. The first gain switching chamber G1 is configured in such a way that the surface area of the spool 12 constituting the end surface toward the linear solenoid 14 (left side) is greater than the surface area of the spool 12 constituting the end surface toward the spring 13 (right side). The sleeve 11 is drilled with a first gain switching port G1$a$ in communication with the first gain switching chamber G1.

The shift valve 2 is connected with the oil passage L1 via a branching passage L1$b$. The shift valve 2 is composed of a sleeve 21, a spool 22 slidably inserted in the sleeve 21, and a spring 23 biasing the spool 22 leftward.

The sleeve 21 is drilled with an input port 21a connected to the branching passage L1b, an output port 21b, and a drain port 21c. The output port 21b is in communication with the first gain switching port G1a disposed in the linear solenoid valve 1 via an oil passage L2.

A left end portion of the sleeve 21 is drilled with an actuation oil pressure port 21d. When an On-Off solenoid valve (not shown) is opened, a line pressure PL is supplied to the actuation oil pressure port 21d. As the line pressure PL is supplied to the actuation oil pressure port 21d, the spool 22 moves rightward against the biasing force of the spring 23, bringing the input port 21a and the output port 21b to a communicated state (supply state) (refer to the upper half part of the shift valve 2 in FIG. 1).

When the On-Off solenoid valve is closed, the supply of the line pressure PL to the actuation oil pressure port 21d is stopped; as a result, the spool 22 is moved leftward by the biasing force of the spring 23, bringing the communication between the input port 21a and the output port 21b to a blocked state (refer to the lower half part of the shift valve 2 in FIG. 1).

When a shift lever (not shown) is set in the D range (forward gear speed position), the TCU (controller, not shown) opens the On-Off solenoid valve to supply the line pressure PL to the actuation oil pressure port 21d; when the shift lever is set in the R range (reverse gear speed position), the TCU closes the On-Off solenoid valve to stop the supply of the line pressure PL to the actuation oil pressure port 21d. In other words, the shift valve 2 is in the communicated state (supply state) at a forward gear speed and in the blocked state at a reverse gear speed.

Figure 2:
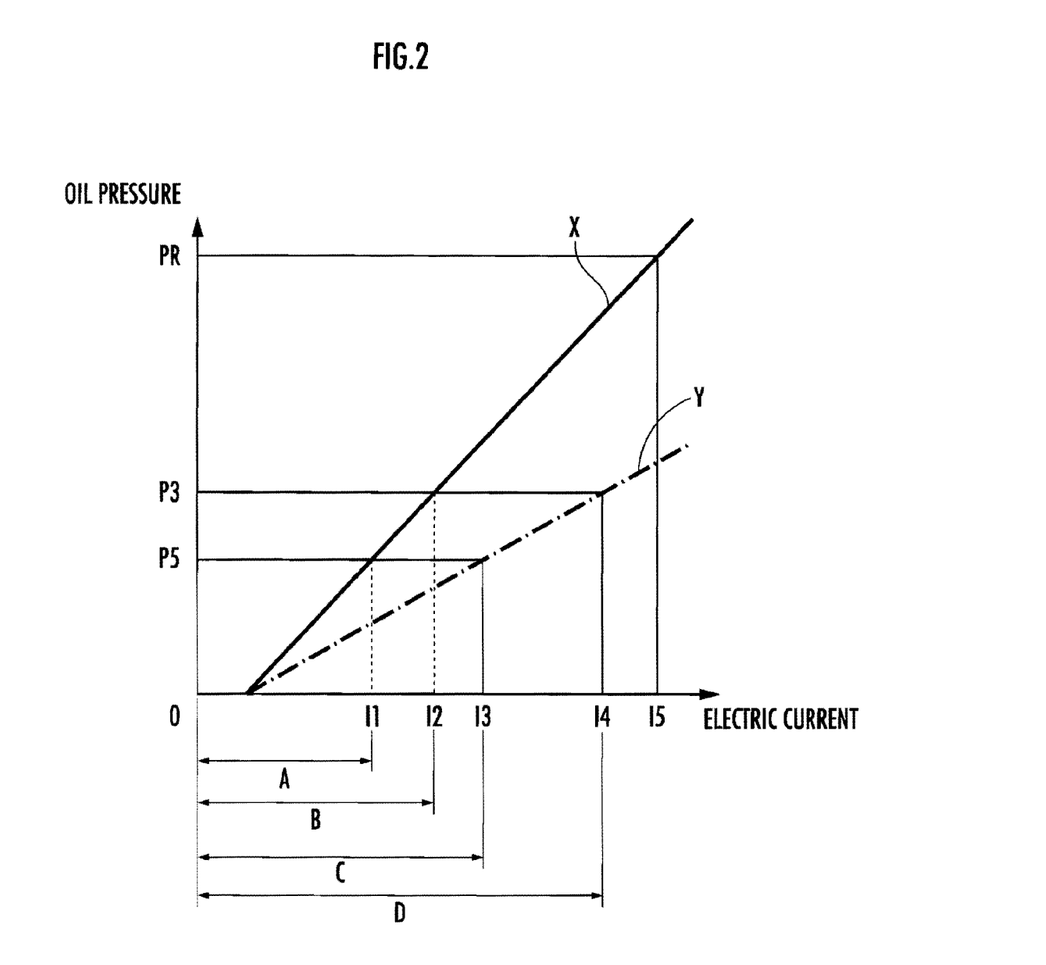
FIG. 2 is a diagram illustrating gain characteristic of the first embodiment.

FIG. 2 illustrates the gain characteristic (current-oil pressure characteristic) of the linear solenoid valve 1 according to the first embodiment. The engagement element CL of the first embodiment is configured to be engaged in establishing a reverse gear speed, a 3F gear speed and a 5F gear speed. If the necessary oil pressures for establishing the reverse gear speed, the 3F gear speed and the 5F gear speed are denoted by PR, P3 and P5, respectively, the necessary oil pressures are set to satisfy the relationship of PR>P3>P5.

In FIG. 2, the solid line X illustrates the gain characteristic when the input port 21a and the output port 21b of the shift valve 2 are in the blocked state, and the chain line Y illustrates the gain characteristic when the input port 21a and the output port 21b of the shift valve 2 are in the communicated state (supply state).

If the engagement element CL is controlled according to one gain characteristic as in the conventional arts, it is necessary to have the maximum output oil pressure from the linear solenoid valve 1 matched with the necessary oil pressure PR for the reverse gear speed which is the greatest necessary oil pressure. Thus, in the case of establishing the 3F gear speed, it is necessary to control the driving current in a current range B from 0 to I2 so as to supply the necessary oil pressure to establish the 3F gear speed. Moreover, in the case of establishing the 5F gear speed, it is necessary to control the driving current in a current range A from 0 to I1 so as to supply the necessary oil pressure to establish the 5F gear speed.

However, according to the hydraulic control device of the first embodiment, in establishing a forward gear speed, the shift valve 2 is switched to the communicated state (supply state), and the biasing force toward the linear solenoid 14 (the left side) is increased by supplying the output oil pressure to the first gain switching chamber G1 via the shift valve 2 so as to obtain the second gain characteristic as illustrated by the chain line Y in FIG. 2.

Thereby, it is possible to control the current in a current range D from 0 to I4 in establishing the 3F gear speed and to control the current in a current range C from 0 to I3 in establishing the 5F gear speed. Therefore, it is possible to finely control the output oil pressures for establishing the 3F gear speed and the 5F gear speed, which improves the controllability of the engagement element CL. In the first embodiment, the reverse gear speed corresponds to a first gear speed of the present invention, and the 3F gear speed and the 5F gear speed correspond to a second gear speed of the present invention.

Figure 3:
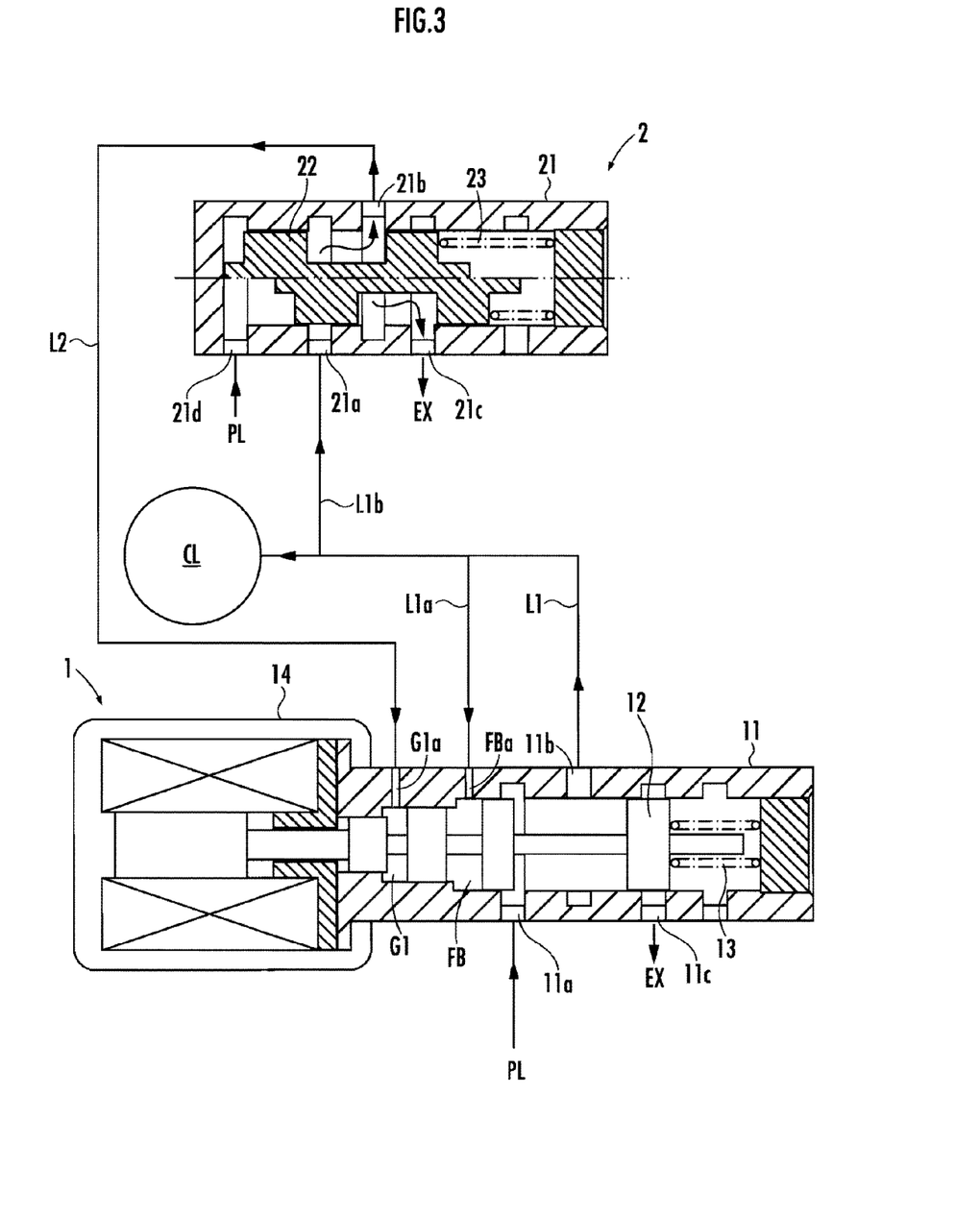
FIG. 3 is a diagram illustrating the hydraulic control device disposed with a linear solenoid valve of a normally open type in the first embodiment.

In the first embodiment, the linear solenoid valve 1 is described to be a normally close type; however, it is acceptable that the linear solenoid valve 1 is a normally open type which opens in a state where no electric current is applied (non-conducting state). In this case, the feedback chamber FB and the first gain switching chamber G1 are configured in such a way that the surface area of the spool 12 constituting the end surface toward the linear solenoid 14 (left side) is smaller than the surface area of the spool 12 constituting the end surface toward the spring 13 (right side) so that the biasing forces generated in the feedback chamber FB and the first gain switching chamber G1 bias to close the input port.

Second Embodiment

Figure 4:
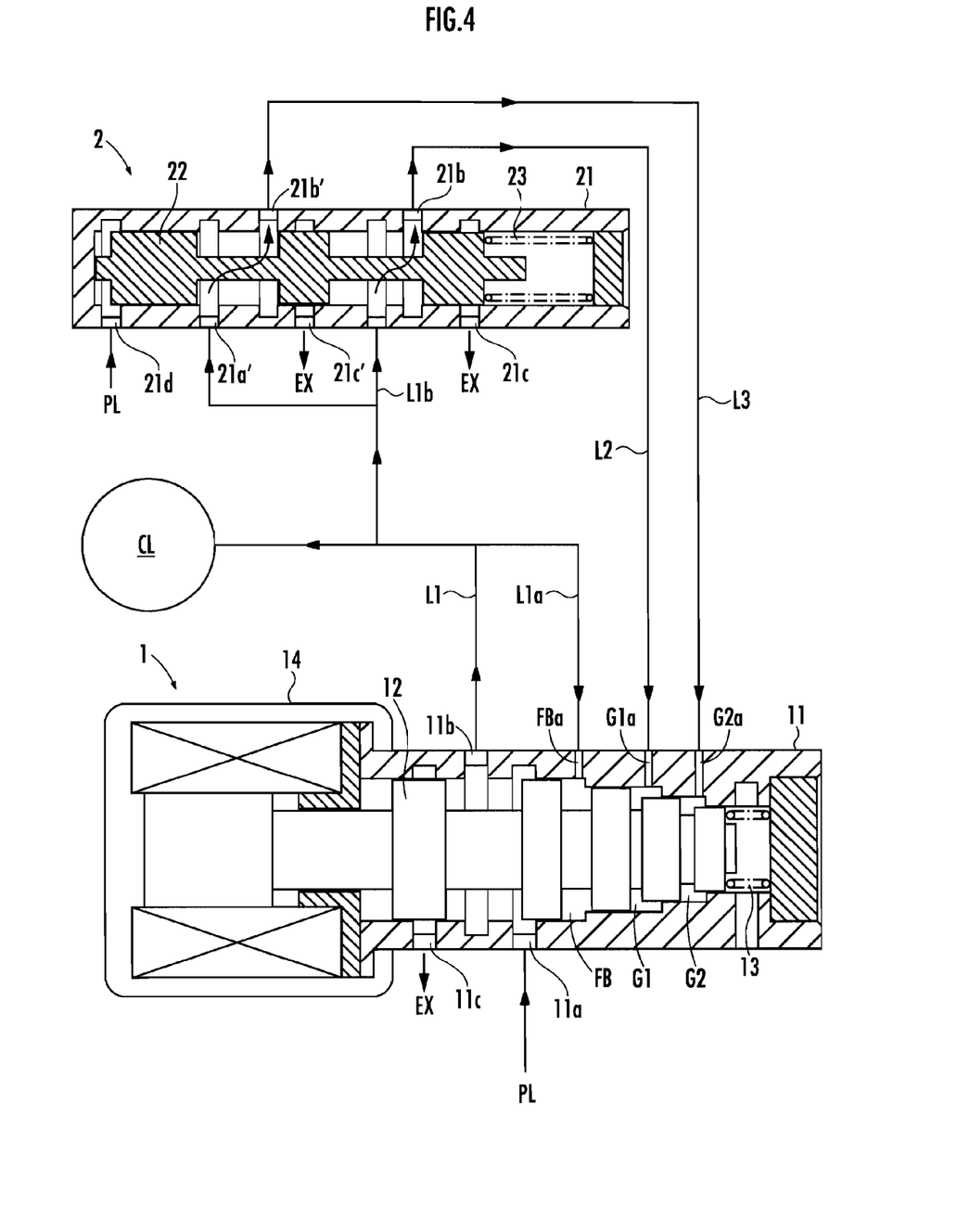
FIG. 4 is a diagram illustrating the hydraulic control device of a second embodiment of the present invention.

A second embodiment of the present invention will be described in detail with reference to FIG. 4 through FIG. 6. Similar to the first embodiment, the hydraulic control device of the second embodiment is provided with the linear solenoid valve 1 configured to regulate the line pressure PL and supply it to the wet multi-plate clutch CL, and the shift valve 2.

In the second embodiment, a circular second gain switching chamber G2 is defined in the linear solenoid valve 1 by the sleeve 11 and the spool 12 at a position right to the feedback chamber FB. Similar to the first gain switching chamber G1, the second gain switching chamber G2 is also configured in such a way that the surface area of the spool 12 constituting the end surface toward the linear solenoid 14 (left side) is greater than the surface area of the spool 12 constituting the end surface toward the spring 13 (right side).

The sleeve 11 is drilled with a second gain switching port G2a in communication with the second gain switching chamber G2.

The shift valve 2 in the second embodiment is provided with 2 input ports, namely, a first input port 21a and a second input port 21a'; 2 output ports, namely, a first output port 21b and a second output port 21b'; and 2 drain ports, namely, a first drain port 21c and a second drain port 21c'. The output oil pressure from the linear solenoid valve 1 is supplied to the first input port 21a via the branching passage L1b branched from the oil passage L1. The output oil pressure from the linear solenoid valve 1 is supplied to the second input port 21a' via a branching passage L1c branched from the oil passage L1.

The first output port 21b is connected to the first gain switching port G1a via the oil passage L2. The second output port 21b' is connected to the second gain switching port G2a via an oil passage L3.

In the hydraulic control device of the second embodiment, the opening degree of the accelerator pedal is divided into 3 levels of large, middle and small, and the line pressure PL is switched by a regulator valve (not shown) to 3 levels of high pressure, middle pressure and low pressure in accordance with the large, middle and small levels of the opening degree. Although the regulator valve is configured to output a defined line pressure PL by the biasing force from the spring biasing the spool in the regulator valve, by supplying the oil pressure from the linear solenoid valve for the regulator valve to the regulator valve to bias the spool in the regulator valve against the biasing force from the spring, it is possible for it to regulate the line pressure PL in 3 levels.

The shift valve 2 is configured to be switchable in 3 states in accordance with the line pressure PL. Specifically, when the line pressure PL is low, the shift valve 2 is switched to a fully communicated state (first supply state) in which the first input port 21a and the first output port 21b are communicated and the second input port 21a' and the second output port 21b' are communicated (refer to FIG. 4).

Figure 5:
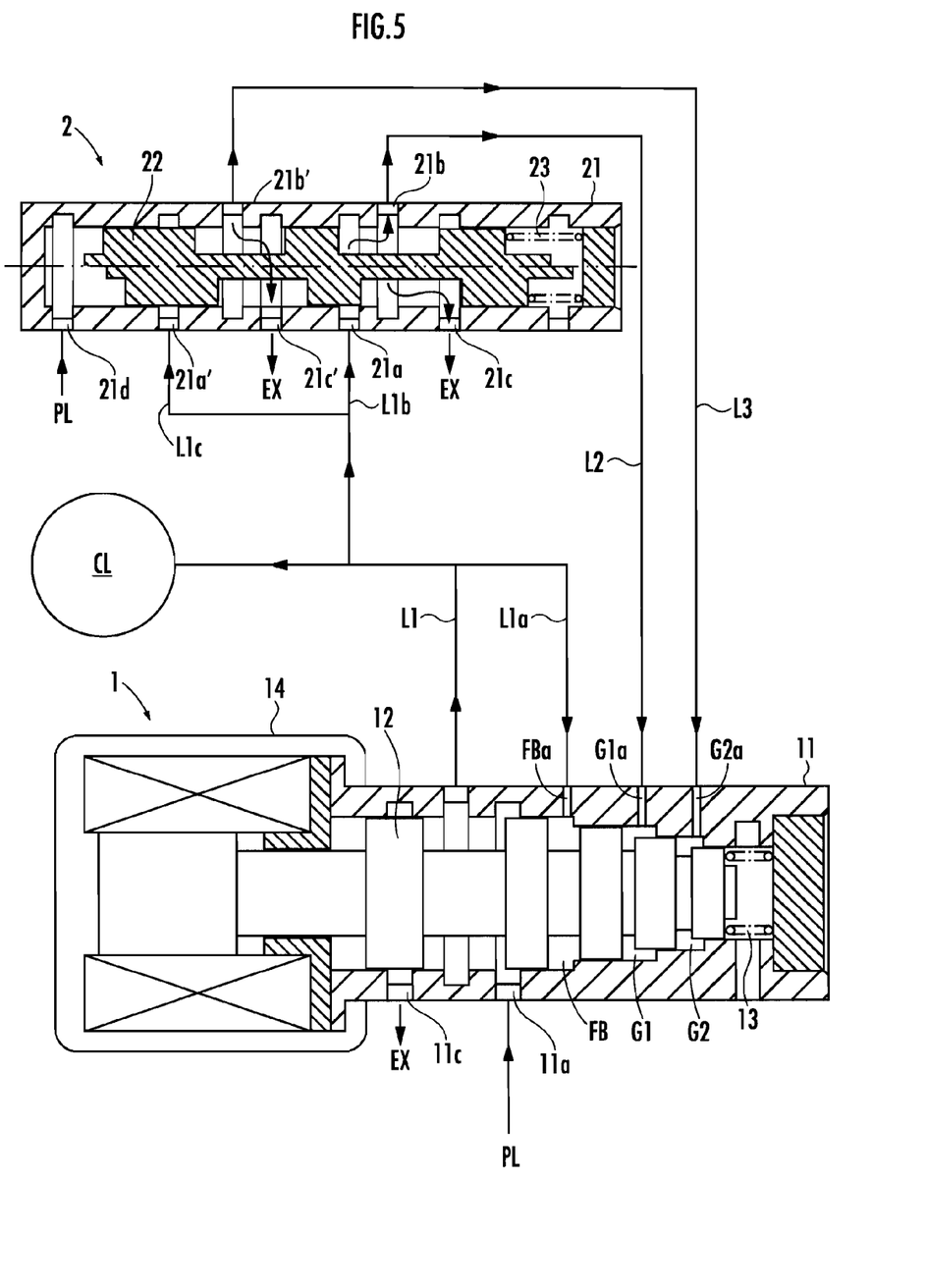
FIG. 5 is a diagram illustrating an operating state of a shift valve of the second embodiment.

When the line pressure PL is middle, as illustrated by the upper half part of the shift valve 2 in FIG. 5, the shift valve 2 is switched to a partially communicated state (second supply state) in which the first input port 21a and the first output port 21b are communicated and the communication between the second input port 21a' and the second output port 21b' is blocked.

When the line pressure PL is high, as illustrated by the lower half part of the shift valve 2 in FIG. 5, the shift valve 2 is switched to a blocked state in which both the communication between the first input port 21a and the first output port 21b and the communication between the second input port 21a' and the second output port 21b' are blocked.

The necessary oil pressure for engaging the wet multi-plate clutch CL which is equivalent to the engagement element in the second embodiment is configured to be switchable between 3 levels of high pressure Ph, middle pressure Pm and low pressure Pl in accordance with the opening degree of the accelerator pedal (not shown). The switch between high pressure Ph, middle pressure Pm and low pressure Pl is performed in accordance with the switch between high pressure, middle pressure and low pressure of the line pressure PL. The other configurations except those mentioned above are identical to that in the first embodiment, thereby, are given with identical numerals.

Figure 6:
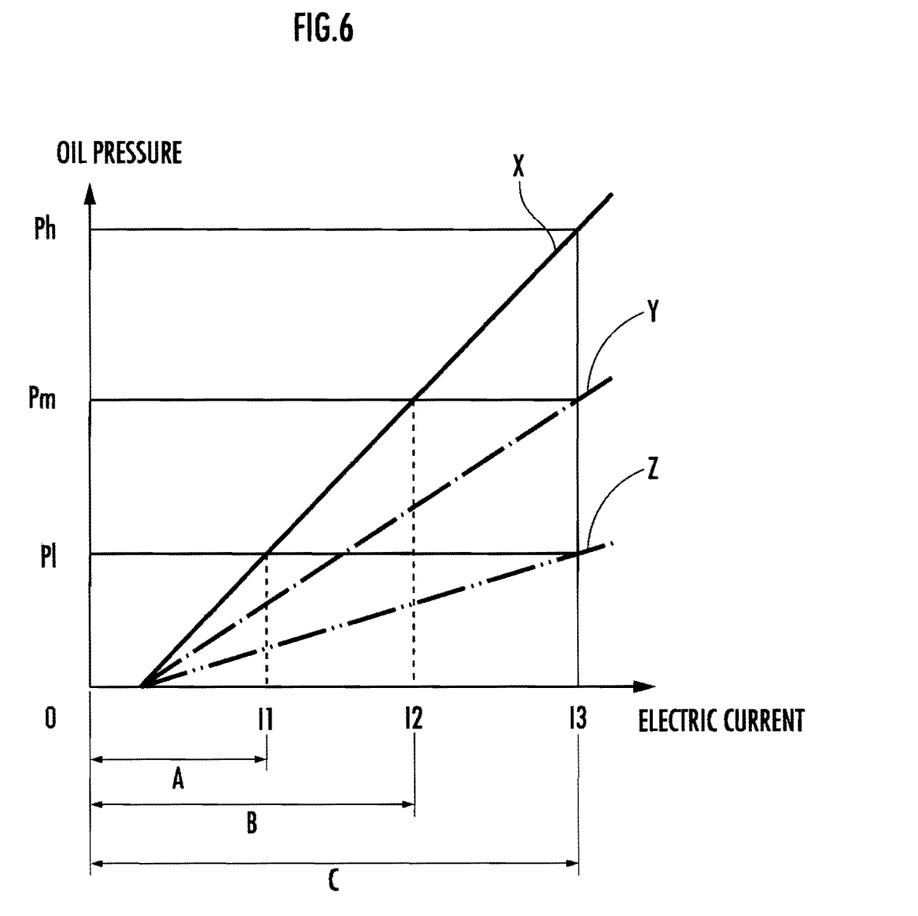
FIG. 6 is a diagram illustrating gain characteristic of the second embodiment.

According to the hydraulic control device for the automatic transmission of the second embodiment, the gain characteristic of the linear solenoid valve 1 can be switched between 3 levels as illustrated in FIG. 6 according to the line pressure PL which is switchable in accordance with the opening degree of the accelerator pedal.

Specifically, when the line oil pressure PL is high, the shift valve 2 is switched to the blocked state, no biasing force is generated in both of the gain switching chambers G1 and G2, the gain characteristic is illustrated by the solid line X in FIG. 6. When the line oil pressure PL is middle, the shift valve 2 is switched to the partially communicated state (second supply state) and a biasing force leftward is generated in the first gain switching chamber G1, the gain characteristic is illustrated by the chain line Y in FIG. 6. When the line oil pressure PL is low, the shift valve 2 is switched to the fully communicated state (first supply state) and a biasing force leftward is generated in both the first gain switching chamber G1 and the second gain switching chamber G2, the gain characteristic is illustrated by the two-dotted chain line Z in FIG. 6.

In the wet multi-plate clutch CL, the necessary oil pressure is switchable between 3 levels according to the opening degree of the accelerator pedal (not shown). If the wet multi-plate clutch CL is controlled according to one gain characteristic as in the conventional arts, it is necessary to set the maximum output oil pressure from the linear solenoid valve 1 to the greatest necessary oil pressure Ph. Thus, in case that the necessary oil pressure for the wet multi-plate clutch CL is a low necessary oil pressure Pl, it is necessary to control the driving current in the current range A from 0 to I1; in case that the necessary oil pressure for the wet multi-plate clutch CL is a middle necessary oil pressure Pm, it is necessary to control the driving current in the current range B from 0 to I2; the control range becomes narrow, and thereby the controllability is deteriorated.

In the hydraulic control device of the second embodiment, the shift valve 2 is switched between 3 levels according to the line oil pressure PL which is switchable in accordance with the necessary oil pressure, when the necessary oil pressure is a low necessary oil pressure Pl, the gain characteristic is denoted by the two-dotted chain line Z and when the necessary oil pressure is a middle necessary oil pressure Pm, the gain characteristic is denoted by the chain line Y.

Therefore, even if the necessary oil pressure of the wet multi-plate clutch CL is switched to any state of Ph, Pm and Pl in accordance with the opening degree of the accelerator pedal, it is possible to control the linear solenoid valve 1 in the current range C from 0 to I3, the control range becomes wider, thereby to improve the controllability of the wet multi-plate clutch.

In the second embodiment, the linear solenoid valve 1 is described to be a normally close type; however, similar to the first embodiment, it is acceptable that the linear solenoid valve 1 is a normally open type.

Third Embodiment

A third embodiment of the present invention will be described in detail with reference to FIG. 7 and FIG. 8. The hydraulic control device of the third embodiment is provided with the linear solenoid valve 1 configured to regulate the line pressure PL for outputting, and the shift valve 2 to which the output oil pressure of the linear solenoid valve 1 is supplied.

The linear solenoid valve 1 in the third embodiment is identical to that in the first embodiment.

The shift valve 2 in the third embodiment selectively supplies the output oil pressure from the linear solenoid valve 1 to an actuation oil pressure chamber 31 serving as a driving source for driving a shift fork 3 which in turn drives a sleeve disposed in the wet multi-plate clutch CL or an intermeshing mechanism (not shown. It is acceptable that the intermeshing mechanism has a synchromesh function.).

The shift valve 2 of the third embodiment will be described in detail hereinafter. The sleeve 21 of the shift valve 2 is drilled with a single input port 21a; 2 output ports, namely, a first output port 21b and a second output port 21b'; and 2 drain ports, namely, a first drain port 21c and a second drain port 21c'. The input port 21a is connected with the output port 11b of the linear solenoid valve 1 via the oil passage L1.

The first output port 21b is connected with the wet multi-plate clutch CL, which is equivalent to the engagement element, via the oil passage L2. The oil passage 12 is disposed with a branching passage L2a connected to the first gain switching port G1a. The second output port 21b' is connected with the actuation oil pressure chamber 31 for the intermeshing mechanism (not shown) equivalent to the engagement element via the oil passage L3.

The transmission control unit TCU (controller, not shown) is configured to supply or stop the supply of the line pressure PL to the actuation oil pressure port 21d of the shift valve 2 by opening or closing an On-Off solenoid valve (not shown). When the On-Off solenoid valve (not shown) is opened to supply the line pressure PL to the actuation oil pressure port 21*d*, as illustrated by the lower half part of the shift valve 2 in FIG. 7, the spool 22 is moved rightward against the biasing force of the spring 23.

Thereby, the input port 21*a* and the first output port 21*b* are communicated. The output oil pressure from the linear solenoid valve 1 is supplied to the wet multi-plate clutch CL via the oil passage L1, the shift valve 2 and the oil passage L2. Moreover, the output oil pressure from the linear solenoid valve 1 is supplied to the first gain switching port G1*a* via the branching passage L2*a* as well.

Figure 7:
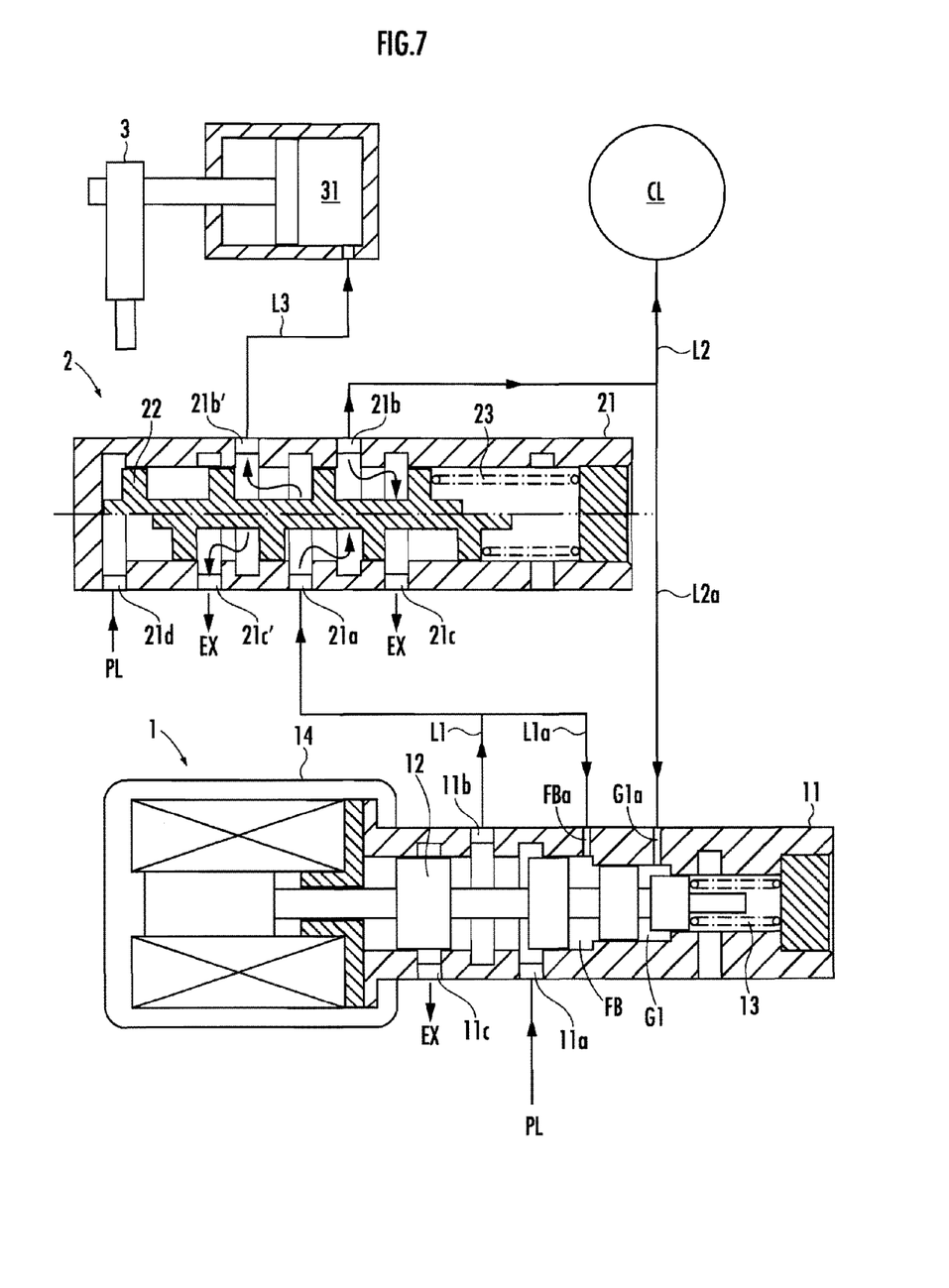
FIG. 7 is a diagram illustrating the hydraulic control device of a third embodiment of the present invention.

When the On-Off solenoid valve (not shown) is closed and the supply of the line pressure PL to the actuation oil pressure port 21*d* is stopped, as illustrated by the upper half part of the shift valve 2 in FIG. 7, the spool 22 is moved leftward by the biasing force of the spring 23. Thereby, the input port 21*a* and the second output port 21*b*' are communicated. The output oil pressure from the linear solenoid valve 1 is supplied to the actuation oil pressure chamber 31 for driving the shift fork 3 in the intermeshing mechanism (not shown) via the oil passage L1, the shift valve 2 and the oil passage L3.

Figure 8:
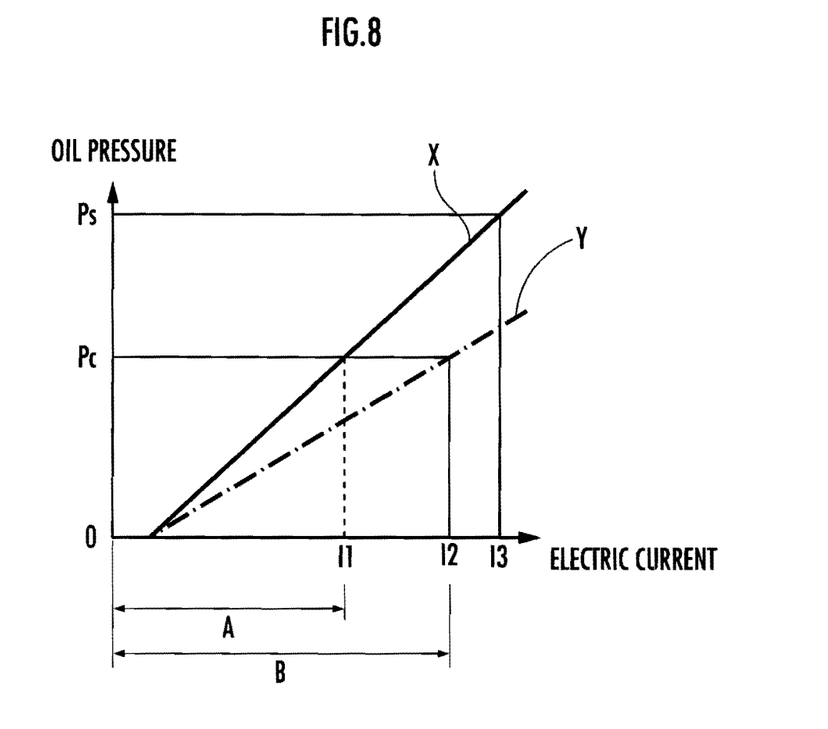
FIG. 8 is a diagram illustrating gain characteristic of the third embodiment.

FIG. 8 illustrates the gain characteristic (current-oil pressure characteristic) of the linear solenoid valve 1 according to the third embodiment. In FIG. 8, the vertical axis denotes the output oil pressure from the linear solenoid valve 1, and the horizontal axis denotes the driving current for the linear solenoid 14 in the linear solenoid valve 1. Ps denotes the necessary oil pressure for driving the shift fork 3 so as to engage the intermeshing mechanism (not shown), and Pc denotes the necessary oil pressure for engaging the wet multi-plate clutch CL.

Generally, the wet multi-plate clutch CL is configured to have an upper oil pressure limit which is possible to be applied to a piston from the viewpoint of pressure capacity or the like of friction materials. However, the shift fork 3 in the intermeshing mechanism (not shown) is a small piston and is required to be actuated instantly, thereby, a high pressure is required. Thus, the necessary oil pressure Ps for the shift fork 3 and the necessary oil pressure Pc for the wet multi-plate clutch CL satisfy the relationship of Ps>Pc.

As in the conventional arts, when the linear solenoid valve has only one gain characteristic, it is necessary to control the current in a narrow range so as to engage the engagement element at a low necessary oil pressure, the controllability is not good.

In the hydraulic control device of the third embodiment, in the case of supplying the output oil pressure from the linear solenoid valve 1 to the wet multi-plate clutch CL having a low necessary oil pressure, the output oil pressure is supplied to the first gain switching chamber G1 via the oil passage L2*a* (at this moment, the shift valve 2 is switched to the supply state); when the output oil pressure is supplied to the first gain switching chamber G1, the biasing force for biasing the spool 12 leftward increases, which in turn gives the linear solenoid valve 1 the second gain characteristic as illustrated in FIG. 8 by the chain line Y.

In the case of supplying the output oil pressure from the linear solenoid valve 1 to the actuation oil pressure chamber 31 of the shift fork 3 having a high necessary oil pressure, the output oil pressure is not supplied to the first gain switching chamber G1, namely, the shift valve 2 is switched to the blocked state.

According thereto, it is possible to engage the wet multi-plate clutch CL in the current range B of 0 to I2 which is wider than the current range A of 0 to I1 used to control the conventional ones, thereby the controllability of the wet multi-plate clutch CL is improved.

Additionally, in the hydraulic control device of the third embodiment, the shift valve 2 for switching the supply destination of the output oil pressure from the linear solenoid valve 1 is provided with a function to switch the gain characteristic of the linear solenoid valve 1 as well. Therefore, compared with the case where a shift valve for switching the gain characteristic is additionally disposed, it is possible to reduce the numbers of components so as to simplify and miniaturize the structure thereof.

Further, in the hydraulic control device of the third embodiment, as the shift valve 2 is in the state of supplying the output oil pressure from the linear solenoid valve 1 to the wet multi-plate clutch CL, the oil pressure is configured to be drained from the actuation oil pressure chamber 31 via the drain port 21*c*'. Thus, it is impossible to simultaneously engage the intermeshing mechanism (not shown) which is equivalent to the engagement element and the wet multi-plate clutch CL; however, when it is constructed so as to be able to supply the line pressure PL to the drain port 21*c*', it is possible to simultaneously engage the wet multi-plate clutch CL by the output oil pressure from the linear solenoid valve 1 while the intermeshing mechanism is maintained in the engaged state by the line pressure PL.

Similar to the first embodiment and the second embodiment, it is acceptable that the linear solenoid valve 1 in the third embodiment is a normally open type.

DESCRIPTION OF REFERENCE NUMERALS

1: linear solenoid valve; 11: sleeve; 11*a*: input port; 11*b*: output port; 11*c*: drain port; 12: spool; 13: spring; 14: linear solenoid; 2: shift valve; 21: sleeve, 21*a*, 21*a*': input port; 21*b*, 21*b*': output port; 21*c*: drain port; 21*d*: actuation oil pressure port; 22: spool; 23: spring; 3: shift fork; 31: actuation oil pressure chamber; CL: wet multi-plate clutch; FB: feedback chamber; FB*a*: feedback port; G1: first gain switching chamber; G1*a*: first gain switching port; G2: second gain switching chamber (second embodiment); G2*a*: second gain switching port (second embodiment); L1, L2, L3: oil passage; and L1*b*, L1*c*, L2*a*: branching passage.

What is claimed is:
1. A hydraulic control device for an automatic transmission, comprising:
a linear solenoid valve configured to regulate a line pressure and supply it to an engagement element;
a shift valve configured to be supplied with an output oil pressure from the linear solenoid valve; and
a controller configured to control the linear solenoid valve and the shift valve;
wherein
the linear solenoid valve is composed of a sleeve, a spool slidably inserted in the sleeve, a spring for biasing the spool, and a linear solenoid capable of biasing the spool against a biasing force of the spring;
the linear solenoid valve is provided with a gain switching chamber which generates a biasing force in a direction to close the linear solenoid valve to switch the gain characteristics of the linear solenoid valve when supplied with an oil pressure;
the shift valve is configured to be freely switched between a supply state in which the output oil pressure from the linear solenoid valve is supplied to the gain switching chamber of the linear solenoid valve and a blocked state in which the supply of the output oil pressure is blocked; and the controller is configured to bring the shift valve into the blocked state when a necessary oil pressure of the engagement element is high and into the supply state when the necessary oil pressure of the engagement element is low.

2. The hydraulic control device for the automatic transmission according to claim 1, wherein the shift valve is supplied with the output oil pressure from the linear solenoid valve via a branching passage branched from an oil passage configured to guide the output oil pressure from the linear solenoid valve to the engagement element;

the engagement element is a wet multi-plate clutch capable of being engaged at a plurality of gear speeds of the automatic transmission, and a first necessary oil pressure is required to engage the wet multi-plate clutch at a first gear speed in the plurality of gear speeds and a second necessary oil pressure lower than the first necessary oil pressure is required to engage the wet multi-plate clutch at a second gear speed in the plurality of gear speeds; and the controller is configured to switch the shift valve to the blocked state at the first gear speed and switch the shift valve to the supply state at the second gear speed.

3. The hydraulic control device for the automatic transmission according to claim 1, wherein the shift valve is supplied with the output oil pressure from the linear solenoid valve via a branching passage branched from an oil passage configured to guide the output oil pressure from the linear solenoid valve to the engagement element;

the necessary oil pressure of the engagement element is configured to be switched between a plurality of levels and switched to a high pressure in accordance with an increment on an opening degree of an accelerator pedal;

the controller is configured to switch the line pressure, which is regulated by a regulator valve, between a plurality of levels by controlling the output oil pressure from the linear solenoid valve for regulator valve, and switch the line pressure to a high pressure in accordance with an increment on the opening degree of the accelerator pedal; and the shift valve is configured to be switched between the supply state and the blocked state according to the supply of the output oil pressure or the line pressure from the linear solenoid valve for regulator valve in such a way that the shift valve is switched to the blocked state when the line pressure is high and to the supply state when the line pressure is low.

4. The hydraulic control device for the automatic transmission according to claim 3, wherein the linear solenoid valve is disposed with a plurality of the gain switching chambers;

the line pressure and the necessary oil pressure of the engagement element are configured to be switchable among 3 levels or more in accordance with the opening degree of the accelerator pedal; and the shift valve is configured to be switched to the blocked state when the line pressure is maximum, and switched to the supply state at a plurality of levels to increase the numbers of the gain switching chambers supplied with the output oil pressure from the linear solenoid valve as the line pressure decreases sequentially.

5. The hydraulic control device for the automatic transmission according to claim 1, wherein the shift valve is connected to two engagement elements having different necessary oil pressures, and the shift valve is configured to be switched to the blocked state if the output oil pressure from the linear solenoid valve is supplied to one engagement element having a higher necessary oil pressure and to the supply state if the output oil pressure from the linear solenoid valve is supplied to the other engagement element having a lower necessary oil pressure.

* * * * *